310-334 SR CROSS REFERENCE SEARCH ROOM
XR 3,441,754

April 29, 1969 S. HENY 3,441,754

BASE MOUNTED PIEZOELECTRIC TRANSDUCER ASSEMBLY HAVING INTERMEDIATE STRESS ABSORBING MEMBER

Filed May 31, 1966

INVENTOR
STEVE HENY

BY Wenderoth, Lind & Ponack
ATTORNEYS

United States Patent Office 3,441,754
Patented Apr. 29, 1969

3,441,754

BASE MOUNTED PIEZOELECTRIC TRANSDUCER ASSEMBLY HAVING INTERMEDIATE STRESS ABSORBING MEMBER

Steve Heny, Hublersburg, Pa., assignor to Linden Laboratories, Inc., State College, Pa., a corporation of Pennsylvania Filed May 31, 1966, Ser. No. 554,124
Int. Cl. H01v 7/00
U.S. Cl. 310—9.1 2 Claims

ABSTRACT OF THE DISCLOSURE

A transducer assembly. The assembly has at least one polycrystalline ceramic piezoelectric transducer element bonded to at least one intermediate stress absorbing element which has a high tensile strength and a coefficient of thermal conductivity and a coefficient of thermal expansion which is substantially the same as that of the transducer element. The intermediate stress absorbing element is in turn bonded to a base.

Figure 1:
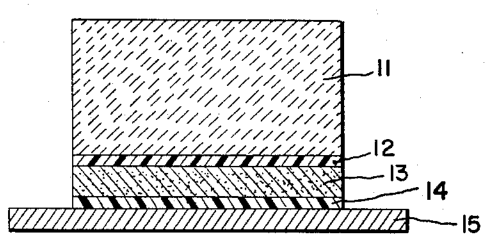

The present invention relates to a piezoelectric transducer assembly which is mounted on a base, and which has a stress-absorbing element between the base and the piezoelectric element.

In order to make use of piezoelectric transducer elements, it is often necessary to mount them on a base. such as the wall of a tank or the like, in order to transfer the vibrations produced in the transducer element to the base. At the present time, such transducer elements are mounted directly on a base, such as a base member or the wall of a tank or the like, use being made of a bonding agent, such as an epoxy resin, to secure the transducer element in place. The assembly is then vibrated, and the vibrations transferred to a liquid within a tank for ultrasonic cleaning of items immersed in the liquid.

Such assemblies, in which the transducer element is bonded directly to a base are subject to certain limitations, however. Because the piezoelectric transducer elements are ceramics, such as polycrystalline barium titanate or lead zirconate titanatex for example, they are relatively weak in tensile strength, and have markedly different coefficients of thermal conductivity and thermal expansion than the base members, which are generally of metal, such as aluminum or steel. As a result, when the assembly undergoes a thermal excursion, for example while being shipped from location to location or even during normal operation where relatively sudden changes in temperature occur, the differences between the thermal coefficients of the piezoelectric element and the base cause very high tensile stresses within the ceramic piezoelectric transducer element, which in turn often causes physical fracture. Other conditions can occur where the actual physical stresses on the base cause distortions which in turn cause a high tensile stress in the ceramic piezoelectric transducer element, thereby often causing physical fracture. Once the transducer element is fractured, the transducer assembly in which it is incorporated becomes useless for producing or transferring ultrasonic vibrations.

It is a further object of the present invention to provide a transducer assembly in which the stresses which result from the differences in the thermal coefficients of the base and the ceramic piezoelectric transducer element or physical stresses in the base are absorbed before they act on the piezoelectric transducer element.

It is an object of the present invention to provide a transducer assembly which will withstand sudden temperature excursions without danger of being fractured, and which will withstand physical stresses on the base members thereof without fracturing.

The transducer assembly according to the present invention comprises a polycrystalline ceramic piezoelectric transducer element, an intermediate stress absorbing element to which said transducer element is bonded, said intermediate stress absorbing element having thermal coefficients of conductivity and expansion close to those of said transducer element and having a high tensile strength, and a base member to which said intermediate stress absorbing element is bonded.

Figure 2:
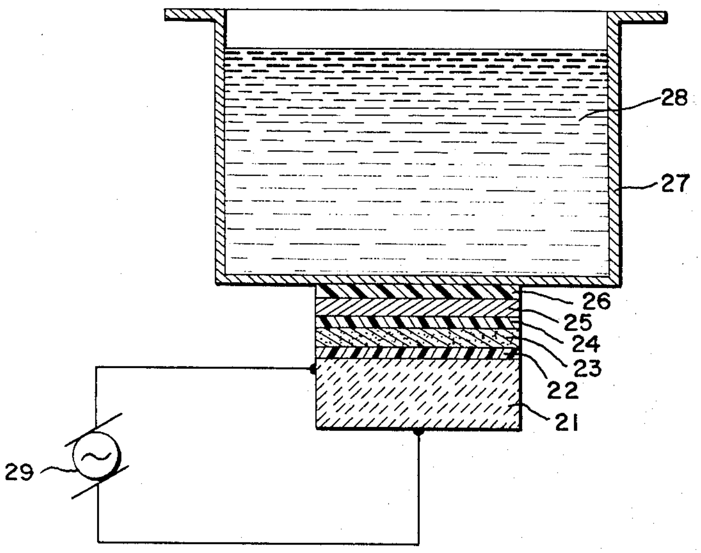

A preferred embodiment of the invention will be described in the following specification, reference being made to the accompanying drawings, in which:

FIG. 1 is a transverse sectional view of a transducer assembly according to the present invention; and FIG. 2 is a diagrammatic view of a transducer assembly according to the present invention incorporated in an ultrasonic cleaning apparatus.

Referring to FIG. 1, there is shown a piezoelectric transducer element 11, which can be of a polycrystalline material such as barium titanate or lead zirconate titanate, which is bonded to an intermediate stress-absorbing element 13 by means of a layer of bonding agent 12, such as an epoxy resin. The intermediate stress absorbing element 13 is the same shape as the transducer element 11, but can be thinner. The element 13 is in turn bonded to a base, which in the embodiment shown is an element 15, by a layer of bonding agent 14, which can be the same material as the bonding agent layer 12.

The material of which the intermediate stress-absorbing element is composed is a material which has substantially the same coefficient of thermal conductivity and the same coefficient of thermal expansion as the ceramic of which the piezoelectric transducer element is composed. In addition, the material of the intermediate stress-absorbing element has a high tensile strength as compared to the ceramic material of the transducer element. It has been found that a boardlike member of layers of cloth impregnated with a mixture of epoxy resin and finely divided alumina or glass makes a satisfactory intermediate stress-absorbing element.

As seen in FIG. 2, the transducer assembly comprising a polycrystalline ceramic piezoelectric transducer element 21 bonded to an intermediate stress absorbing element 23 by a bonding agent layer 2 and a base member 25 to which the intermediate stress-absorbing element 23 is bonded by a layer 24 of bonding agent, is mounted on the outside of a tank 27 by means of a layer of bonding agent 26, which can be an epoxy resin. A liquid 28 is contained within the tank 27, and a source 29 of alternating voltage is connected across the piezoelectric transducer element. When the source of voltage 29 is activated, the transducer element 21 vibrates at an ultrasonic frequency and causes ultrasonic vibrations to be transmitted to the liquid in the tank 27. An article immersed in the liquid will be cleaned.

When the assembly according to the invention is subjected to a sudden change in temperature or the base is subjected to severe physical stresses, substantially all of the physical and/or thermal stresses in the base are absorbed in the high tensile strength member 13 or 23, while the thermal expansion is substantially the same as that of the ceramic transducer element 11 or 21. The transducer element is thus protected from fracture due to transmission of tensile stresses into it.

The transducer assembly according to the invention will be able to withstand thermal excursions from 78° F. to 0° F. in a period of less than 5 minutes without fracture of the ceramic transducer element. Such a thermal excursion would destroy the conventional assembly. In addition, the thickness of the base element need not be restricted in an effort to minimize the stresses transmitted to the ceramic transducer element. It can be made any thickness, even though the thickness causes tensile stresses in the intermediate stress-absorbing element.

The invention is not limited to the specific form of transducer element, other shapes, such as a disc, ring, cube or cylinder being possible. Likewise, more than one such element can be present in the assembly, in which case they can be a plurality of intermediate stress-absorbing members, one for each transducer element, or a single intermediate stress-absorbing member common to all of the transducer elements.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. A transducer assembly comprising at least one polycrystalline ceramic piezoelectric transducer element, at least one intermediate stress-absorbing element to which said transducer element is bonded, and a base to which said intermediate stress-absorbing element is bonded, said intermediate stress-absorbing element being a boardlike member of layers of cloth impregnated with a mixture of a resin and a ceramic material and having a high tensile strength and having a coefficient of thermal conductivity and a coefficient of thermal expansion substantially the same as that of said transducer element.

2. A transducer assembly as claimed in claim 1 in which said transducer element is of a material taken from the group consisting of barium titanate and lead zirconate titanate.

References Cited

UNITED STATES PATENTS

| | | | |
|---|---|---|---|
| 2,589,403 | 3/1952 | Kurie | 310—9.1 |
| 2,824,980 | 2/1958 | Oshry | 310—8.3 |
| 2,875,354 | 2/1959 | Harris | 310—8.3 |
| 2,988,728 | 6/1961 | Marlow | 310—9.8 |
| 3,075,098 | 1/1963 | Shoor | 310—9.1 |
| 3,113,761 | 12/1963 | Rlatzman | 310—9.1 |
| 3,167,668 | 1/1965 | Nesh | 310—9.1 |
| 3,281,613 | 10/1966 | Hatshek | 310—9.8 |

J. D. MILLER, *Primary Examiner*.

U.S. Cl. X.R.

310—8.3, 9.2, 9.8, 8.5, 8.7; 134—1; 29—25.35